Figure 1:
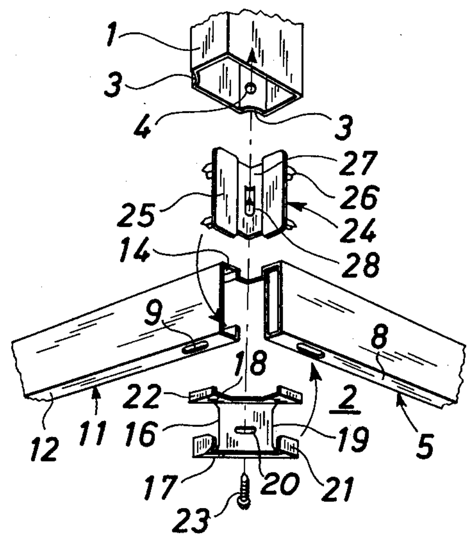

United States Patent [19]

Damberg

[11] 3,981,251

[45] Sept. 21, 1976

[54] ARRANGEMENT AT CORNER JOINTS IN A KNOCK-DOWN SHELVING UNIT

[75] Inventor: Ejvind Damberg, Nykobing Falster, Denmark

[73] Assignee: A/S Raaco Storage Systems, Denmark

[22] Filed: Mar. 21, 1975

[21] Appl. No.: 560,570

[30] Foreign Application Priority Data

Oct. 11, 1974 Denmark .......................... 5343/74

[52] U.S. Cl. .......................... 108/154; 248/188.1; 248/222; 108/156

[51] Int. Cl.² .......................... A47B 3/06

[58] Field of Search .......... 108/154, 156, 111, 155, 108/157; 248/188, 222, 188.1; 211/148

[56] References Cited

UNITED STATES PATENTS

| | | | |
|---|---|---|---|
| 2,143,542 | 1/1939 | Clarin | 248/188 |
| 3,327,658 | 6/1967 | Schreyer | 248/188 X |
| 3,479,975 | 11/1969 | Ferdinand et al. | 108/153 X |
| 3,590,753 | 7/1971 | Blink | 108/155 X |
| 3,620,176 | 11/1971 | Ferdinand et al. | 211/148 X |

*Primary Examiner*—James T. McCall
*Assistant Examiner*—Peter A. Aschenbrenner
*Attorney, Agent, or Firm*—Bucknam and Archer

[57] ABSTRACT

A knock-down shelving unit comprising a plurality of rectangular sheet metal shelves supported by vertical posts having a substantially rectangular cross-section, but in two adjacent corners being provided with groove-like deformations with spaced holes to secure the shelves in selected levels by means of screws. Each shelf has box-like flange portions in the adjoining open ends of which are inserted protecting plastics plates interconnected by a flexible central portion with a guide opening for a screw to be screwed through a mounting device extending obliquely between the two flange portions near the ends thereof.

2 Claims, 2 Drawing Figures

ARRANGEMENT AT CORNER JOINTS IN A KNOCK-DOWN SHELVING UNIT

The present invention relates to an arrangement at corner joints of a knock-down shelving unit of the type having four vertical posts and a plurality of rectangular horizontal sheet metal shelves, each of said shelves comprising a downwardly turned vertical flange portion with an inwardly turned horizontal flange and being at each of the corners of the shelf connected to a post by means of a plate-shaped vertically disposed mounting device in the form of a brace means extending obliquely between two flange portions and having at their lower ends a horizontal flange with upwardly turned lugs received by slots in the horizontal flanges of the shelf and having at their upper ends a horizontal flange supporting the horizontal sheet of the shelf, the vertical portion of the mounting device being provided with a hole for a screw being screwed into the post.

The object of the invention is to facilitate the assemblage of the posts and shelves and particularly to provide for ready insertion of additional shelves in a shelving unit already built up of posts and shelves in such a way that there will be no risk of the shelf damaging the enamel of the posts or the nearest already mounted shelves during the insertion.

The arrangement according to the invention is characterized in that each mounting device is secured partly by a screw and an assembling device in the form of a protective bridge means made of a rather rigid plastics material, said assembling device comprising two protecting plates, each of said protecting plates being by means of retaining lugs so disposed in one of the adjacent free ends of the flange portions as to cover said ends, said plates being interconnected by a flexible central portion, an opening being provided in said central portion to guide and to secure the screw before the shelf is mounted.

By means of the retaining lugs the flexible assembling device may easily be inserted in the free ends of the two substantially box-shaped flange portions adjoining at the corner, and when the mounting device extending obliquely between the flange portions is in place a screw may be retained in the hole in the mounting device and the guiding opening of the assembling device so that the shelf is ready to be screwed on when the screw registers with the selected corresponding hole in the post. Even if the shelf is to be edged in between two shelves in an already assembled shelving unit there is no risk that the enamel of the posts will be scratched, the assembling device forming a soft protecting surface covering the hard metal edges of the free flange ends. The guiding opening in the assembling device gives the screw the correct direction towards the hole in the post, also thereby facilitating the mounting, and finally, the assembling device serves the purpose of securing the screw when tightened.

The invention also relates to an assembling device for the arrangement, said assembling device being characterized in that it comprises two elongated protecting plates of a rather rigid plastics material, said plates having projecting resilient retaining lugs on one side and being interconnected along two longitudinal edges by means of a flexible central portion of which the central axis affords a through-going guiding opening for a screw.

Such a device is inexpensive and easy to produce in an adequately soft and elastic plastics material so that it may be inserted and secured in the flange ends, thus forming an effective protection and a guide means for the screw.

Figure 2:
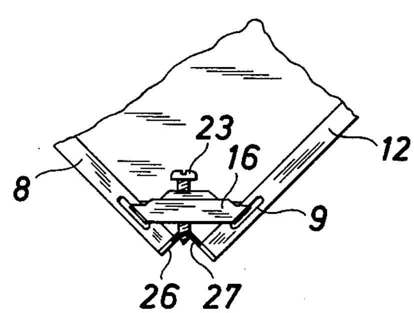

The invention will be described in further detail below with reference to the drawings, in which FIG. 1 is an exploded view of an embodiment of the arrangement according to the invention and FIG. 2 is a corner of a shelf, the mounting device, the assembling device, and the screw being ready to be mounted.

FIG. 1 shows only a portion of one post 1 in a shelving unit comprising four such posts and a plurality of sheet metal shelves 2 mounted between the posts. The post is substantially of rectangular box shape in cross-section, however, in two corners next to each other groove-like deformations 3 are provided, in which suitably spaced holes 4 are punched to secure the shelves.

In the illustrated embodiment the shelf 2 is made of thin sheet metal which is bent so as to provide box-shaped flange portions 5 on two opposite sides. The two walls of the double flange portion 5 are placed at such a distance from each other that a downwardly facing surface 8 is formed, in which a slot 9 is provided near the post 1. Along the two other sides of the shelf flange portions 11 are provided having a downwardly facing surface 12 corresponding to the surface 8 and being also provided with a slot 9. Along all four sides the shelf affords impressions in the form of a reversed groove 14.

A sheet metal mounting device 16 is U-shaped in vertical cross-section so as to form a lower horizontal flange 17 and a horizontal flange 18 extending towards the corner post from a central portion 19 when the mounting device is positioned so that it extends obliquely between the flange portions adjoining at the post in question.

The mounting device in the form of a brace means 16 is disposed so that the upwardly turned lugs 21 of the flange 17 are received by the slots 19 and so that upwardly turned lugs 22 of the flange 18 are received by a recess (not shown) in the flange portion 5 and engage the groove 14 in the flange 12 so that said upwardly turned lugs 22 together with the flange 18 support the upper portion of the shelf. The central portion 19 of the mounting device 16 is provided with a slot 20 through which a screw 23 may be screwed into the hole 4 in the post 1. Before that operation is performed, however, according to the invention an assembling device 24 in the form of a protective bridge means made of a plastics material is positioned so as to cover the openings at the ends of the flange portions 5 and 11 by means of protecting plates 25, thus forming protection preventing the sharp metal edges of the flange from damaging the enamelled posts or the other shelves of the shelving unit. The protecting plates 25 are interconnected by means of a flexible central portion 27, and the plate 25 may be fastened in the flange ends by means of projecting lugs 26 which are formed so that they are slightly resilient and can be pressed into the flange openings. The guiding opening 28 serves the purpose of receiving the point of the screw 23.

In the drawing arrows illustrate how the mounting is performed. First the mounting device 16 is so positioned in the shelf corner that the lugs 21 engage the slots 9 and the lugs 22 support the top wall of the groove 14. Before or after the mounting device is positioned the assembling device, as already described, is placed in the corner between the ends of the flange portions kept in position by the lugs 26, and when both parts are in position the screw 23 is passed through the slot 20, its point being screwed only a small distance into the guiding opening 28 in the assembling device 24, cf. FIG. 2. Then the shelf 2 may be placed between the posts and mounted by the screws, well guided by the guiding opening 28, being screwed further into said guiding opening. The assembling device also serves as a lock washer to secure the tightened screw.

I claim:

1. In a shelving structure in which at least one shelf has a corner portion connected to a post by a screw received in a hole of the post, said shelf being generally horizontal and having vertical flanges with horizontal flanges adjoining said corner portion, said vertical and horizontal flanges having end edges at said corner portion, and there being a mounting brace means extending obliquely between said vertical flanges, said brace means having lugs received by slots in said horizontal flanges, and a hole for the extension therethrough of said screw, the improvement which comprises a protective bridge means having a pair of protective plates connected together by a flexible central portion, said plates having lugs disposed for resilient engagement with corresponding flanges of the shelf to retain the bridge means at the corner portion of the shelf with said protective plates against said end edges and covering same to protect the post against abrasion thereby, said protective plates having respective surfaces each disposed for contact with the post and accommodating movement of the shelf with said surfaces in sliding contact with the post without abrasion of the post; and means defining a hole in said bridge means aligned with the hole in said brace means and disposed to engage the threads of said screw and to align said screw with the hole in the post.

2. The improvement according to claim 1 wherein the hole in said bridge means is in the central flexible portion thereof.

* * * * *